April 18, 1967
A. L. FACCOU
3,314,694
SWIVEL JOINT
Original Filed July 29, 1963
2 Sheets-Sheet 1
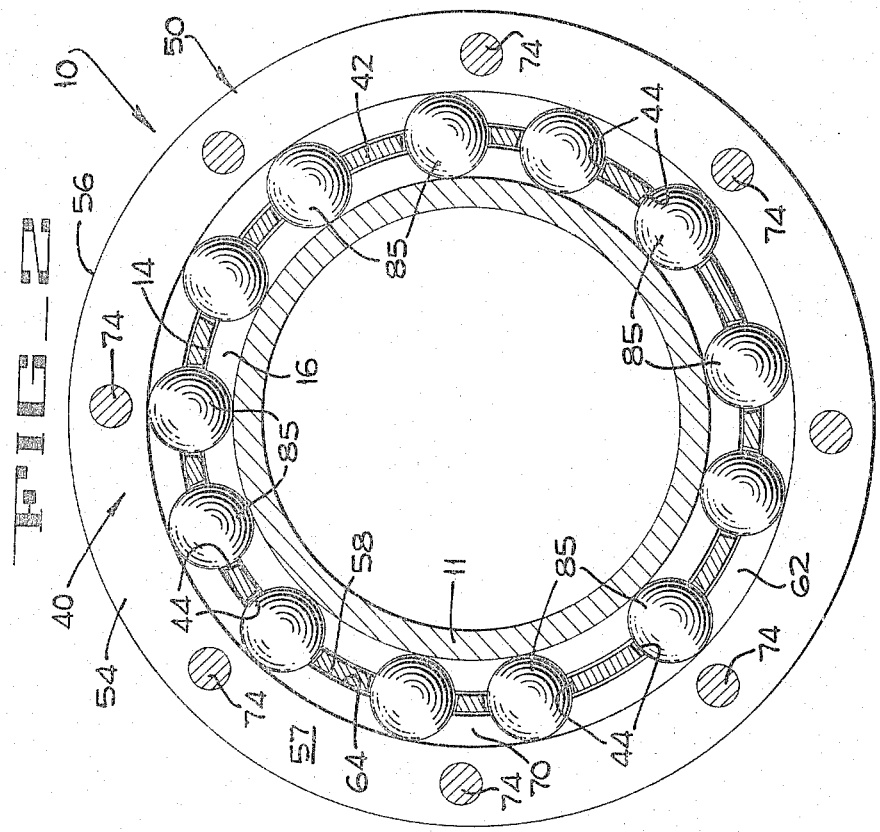
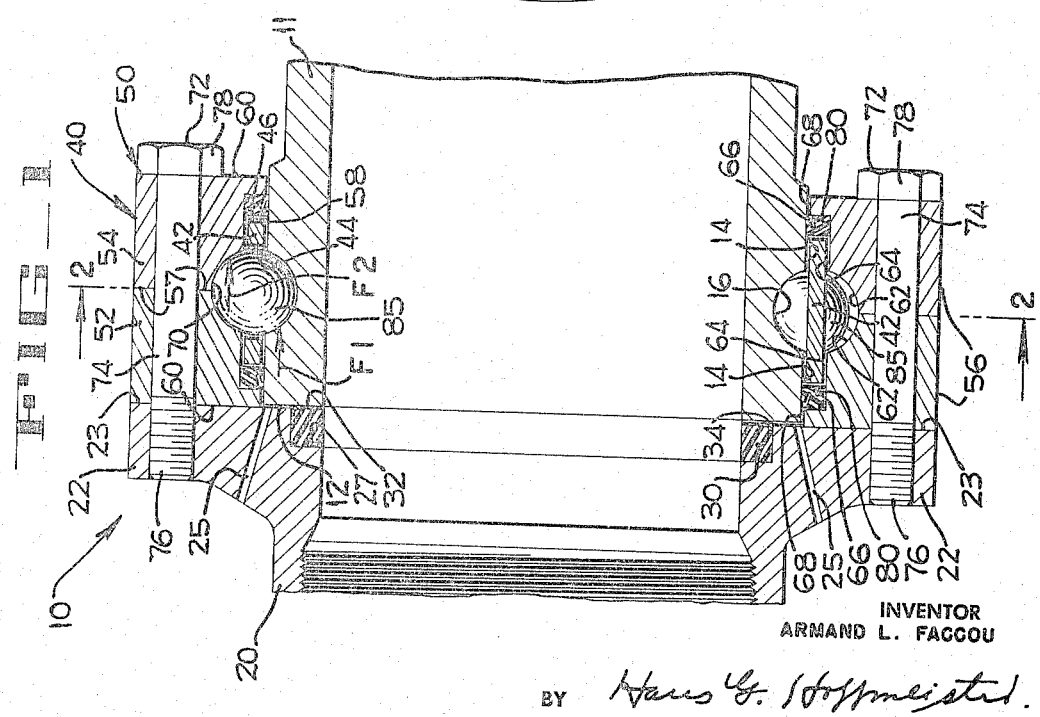
INVENTOR
ARMAND L. FACCOU
BY *Hans G. Hoffmeister*
ATTORNEY

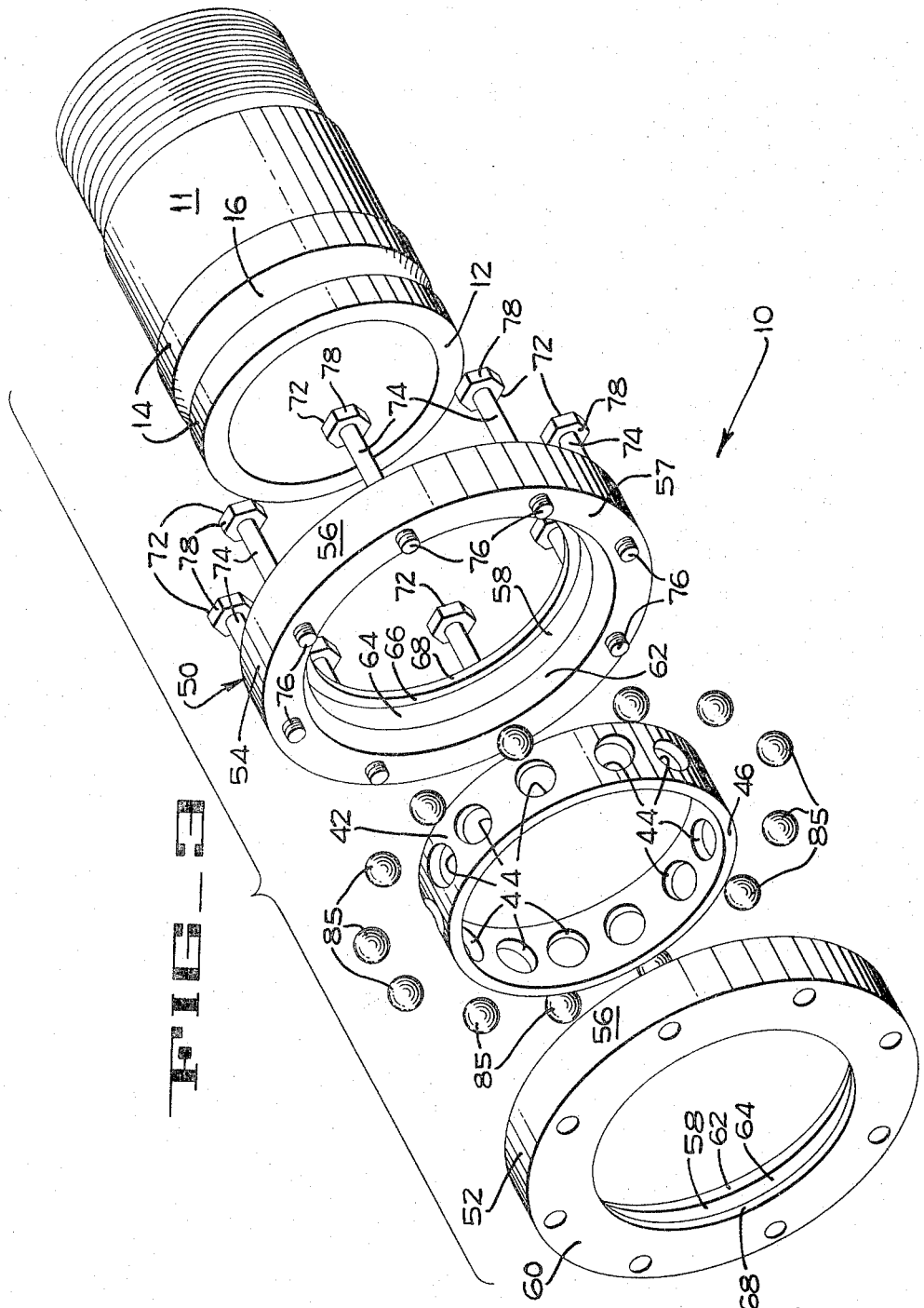

United States Patent Office 3,314,694
Patented Apr. 18, 1967

3,314,694
SWIVEL JOINT
Armand L. Faccou, Santa Ana, Calif., assignor to FMC Corporation, San Jose, Calif., a corporation of Delaware
Continuation of application Ser. No. 298,088, July 29, 1963. This application Sept. 20, 1965, Ser. No. 492,984
5 Claims. (Cl. 285—94)

This application is a continuation of my prior copending application entitled, "Swivel Joint," filed July 29, 1963 and bearing Ser. No. 298,088 and now abandoned.

The present invention pertains to a swivel joint and more particularly to a swivel joint having an improved bearing unit.

As is well known, a typical swivel joint includes a bearing unit rotatably interconnecting a pair of coupling members. This bearing unit usually has an inner bearing associated with one of the coupling members and an outer bearing associated with the other coupling member and surrounding the inner bearing; these inner and outer bearings have confronting inner and outer raceways, and balls are rollably received in the raceways. Conventionally, the outer bearing has a port through which the balls are inserted or removed, and a plug is threaded into this port to retain the balls in the raceways.

When fluid under pressure is carried in a swivel joint, it imposes axial forces which, in tending to separate the joint, press the balls against adjacent portions of the raceways and cause undesired enlargement of the raceways. A disadvantage of the conventional joint is that this enlargement requires replacement of the bearings or the entire swivel joint.

Replacement of the swivel joint or bearings thereof must be made when the balls impress Brinell marks, or dimples, in the raceways. That is, when sufficient axial separating force is imposed between the coupling members of a swivel joint while the coupling members are not rotating relative to each other, the balls are pressed against the raceways so that the balls form dimples in the raceways. Thereafter, when the joint rotates, audible clicks are made and vibrations occur, as the balls roll into and out of the dimples.

Other disadvantages of conventional swivel joints include the necessity of inserting or replacing balls through the port in the outer bearing, the need for a ball retaining plug, and the rubbing and scuffing of adjacent balls in the raceways thereby shortening the useful life of the balls.

It is an object of the present invention to provide a swivel joint with an improved bearing unit.

Another object is to provide a swivel joint with a bearing unit that has parts which can be interchanged, following wear, to provide a substantially non-worn bearing surface.

Another object is to increase the life of the bearing in a swivel joint.

Another object is to obviate the need for replacing the entire bearing unit or the entire swivel joint, following wear of only a portion of the bearing unit.

Another object is to provide a swivel joint in which noise and vibration caused by dimpling of the raceways is minimized.

Another object is to provide a swivel joint which eliminates the port in the outer bearing as a means for inserting and removing the balls, and which also eliminates the ball retaining plug.

Another object is to provide a swivel joint in which rubbing and scuffing between adjacent balls is obviated.

Another object is to provide a swivel joint that is easy to assemble, and which includes a bearing unit having parts that are easy to remove and replace.

Another object is to provide a swivel joint of the nature described above which is simple, economical, and compact.

Another object is to provide a swivel joint which is capable of operating successfully under high fluid pressures while constantly rotating.

These objects, together with other objects, will become apparent upon reference to the following description and accompanying drawings, in which:

FIGURE 1 is a fragmentary longitudinal diametric section of a swivel joint including the bearing unit of the present invention.

FIGURE 2 is a transverse section taken on a plane at a position indicated by line 2—2 in FIGURE 1.

FIGURE 3 is an exploded isometric of one of the coupling members of the swivel joint of FIGURE 1 and the bearing unit of the present invention.

With reference to FIGURE 1, a swivel joint embodying the present invention is generally indicated by the numeral 10. This joint includes a first conduit or coupling member 11 having a radial end face 12 and a cylindrical outer surface 14 constituting an inner bearing. This outer surface is provided with an annular inner raceway 16 which is spaced from the end face of the conduit.

The swivel joint 10 also includes a second conduit or coupling member 20 having an end flange 22 which provides an end face 23 confronting the end face 12 of the first conduit 11 when the swivel joint is assembled. This end flange projects radially outward from the outer surface 14 of the first conduit. Further, the end flange has a plurality of pressure relief ports 25 extending from between the confronting end faces 12 and 23 to the exterior of the swivel joint. In addition, the second conduit has an annular end groove 27 adjacent to the end face 23.

An annular seal 30 of resiliently flexible and compressible material is fitted in the groove 27 of the second conduit 20. This seal is preferably provided with a Teflon race 32 that confronts the radial end face 12 of the first conduit 11. Also, an anti-extrusion ring 34 is provided on the seal to preclude extrusion of the seal between the end faces 12 and 23 as a result of pressure internally of the swivel joint.

The swivel joint 10 is provided with an improved bearing unit, generally identified by the numeral 40, which includes, in addition to the inner bearing 14, a retaining ring 42 that surrounds the inner bearing and is rotatable therearound. The retaining ring has a plurality of circumferentially spaced circular holes 44 of uniform diameter and axially opposite end faces 46; it is positioned on the inner bearing so that the holes overlie the inner raceway 16 and so that the center of the holes lie in a common plane that bisects the inner raceway. A significant feature of the ring is that the holes are randomly and unevenly spaced, as best illustrated in FIGURE 2. Thus, the centers of successively adjacent holes are spaced different distances apart, there being no repetitive pattern in this uneven spacing. For example, the spacings between the centers of the successively adjacent holes might be 1⅝ inch, 1¾ inch, 1⅞ inch, 1¹¹⁄₁₆ inch, 1¹⁵⁄₁₆ inch, 1⅝ inch, 1⅞ inch, and so on. It is evident that the spacings are entirely mixed up. As will be explained, more fully, this uneven spacing minimizes the adverse effects of dimpling.

The bearing unit 40 also includes a transversely split annular outer bearing 50 circumscribing the inner bearing 14 and connected to the second conduit 20. The outer bearing includes spacing and thrust portions 52 and 54 that are identical to each other. Each outer bearing portion has an outer cylindrical surface 56, a radial mating surface 57, an annular inner surface 58, and a radial end surface 60. The inner surface 58 includes a concave raceway segment 62 joining the mating surface, an intermediate raceway segment 64 projecting axially away from the raceway segment, a radial segment 66 extending in from the intermediate segment, and an end segment 68 joining the radial segment and the radial end surface of its respective portion.

The spacing and the thrust portions 52 and 54 are assembled in circumscribing relation to the inner bearing 14 and the retaining ring 42 with the radial end surface 60 of the spacing portion 52 in flush engagement with the end flange 22 of the second conduit 20, with the mating surfaces 57 in engagement, and with the raceway segments 62 forming an outer raceway 70. The axial dimensions of the outer bearing portions are such that the outer raceway faces or overlies the holes 44 in the retaining ring 42 and thus the inner raceway 16; furthermore, the mating surfaces mate in the above-described common plane of the centers of the holes 44. In addition, it is to be noted that the radial segments 66 of the outer bearing portions are axially spaced from the adjacent end faces 46 of the retaining ring.

Bolts 72 are provided for connecting the portions 52 and 54 of the outer bearing 50 to the second conduit 20. These bolts have shanks 74 which extend through the spacing and thrust portions outward of the outer raceway 70 and terminate in ends 76 which are threaded into the end flange 22. The bolts also have heads 78 which engage the radial end surface 60 of the thrust portion 54. It is also to be observed that an annular space between the intermediate segments 64 of the outer bearing and the inner bearing 14 accommodates the retaining ring 42 and permits its rotation relative to the inner and outer bearings. Annular grease-retaining seals 80 encircle the inner bearing and are located between the radial segments 66 and the adjacent end faces 46 of the retaining ring.

A plurality of spherical steel balls 85 are individually received in the holes 44 of the retaining rings 42. These balls are of uniform diameter, slightly less than the uniform diameter of the holes, to permit rotation of the balls therein. Furthermore, the balls project inward from the retaining ring into the inner raceway 16 and outward from the retaining ring into the outer raceway 70. The balls have centers coincident with the centers of their respective holes and are thus unevenly spaced from each other in the same manner as the holes, as discussed above. The balls complementarily rollably engage the inner and outer raceways thereby precluding axial separation of the conduits 11 and 20 and facilitating relative rotation therebetween.

In use of the subject swivel joint 10, fluid under pressure carried through the joint imposes forces against the end faces 12 and 23 tending to separate the conduits 11 and 20. These axial separating forces act on the bearing unit 40, as indicated by the force arrows F1 and F2. As the conduits rotate relatively to each other, the raceway segment 62 on the thrust portion 54 wears faster and to a greater extent than the raceway segment on the spacing portion 52.

When it is desired to renew the bearing unit 40, as a result of wear on the raceway segment 62 of the thrust portion 54, the bolts 72 are unthreaded from the end flange 22 and are removed from the spacing and thrust portions 52 and 54. The thrust and spacing portions are then reversed in position, or interchanged, so that the portion 52 now occupies the former position of the portion 54, and vice versa. When the bolts are once again extended through the spacing and thrust portions and threaded into the end flange, the bearing unit is at least partially renewed since the forces F1 and F2 now urge the balls 85 against the relatively unworn raceway segment 62 of the portion 52, which was initially the spacing portion. The fact that the raceway segment of the portion 54 is worn is of little consequence since the portion 54 now occupies the "spacing" position where its raceway segment does not receive the thrust of separating forces F1 and F2. Of course, in order more completely to renew the bearing unit, it is necessary to replace the first conduit 11 since a portion of its inner raceway 16 may be worn in a manner similar to the wear imposed on the raceway segment of the thrust portion; but by following the principles of the subject invention, the life of outer bearing is increased, and economies are realized. It will be understood that during assembly and disassembly of the bearing unit, the balls 85 are preferably held in the holes 44 of the retaining ring by grease packed around the balls and retaining ring.

If, during use of the subject swivel joint 10, the conduits 11 and 20 remain stationary relative to each other for a sufficiently long time, and during this time, if sufficient axial separating force, as F1 and F2, is imposed on the joint, then the balls 85 impress dimples or Brinell marks, not shown, in the inner and outer raceways 16 and 70. When the conduits once again rotate relatively to each other, however, there is a minimum of axial vibration and audible clicking, because of the uneven spacing of the balls 85. That is, since the retaining ring 42 does not rotate with either the first or second conduit 11 and 20, but rotates at a slower rate, several rotations of the conduits are required before the balls are once again in registration with the dimples that they formed. Stated otherwise, if the balls were evenly spaced in the conventional manner, axial vibration and clicking would occur each time there was relative movement between retaining ring and balls and the raceways by an arcuate distance equal to the spacing between a pair of adjacent balls. With the present invention, axial vibration and clicking, as a result of dimpling, occur only when the dimples and the balls which formed them register once again, and this may require many rotations. Therefore, the adverse effects of dimpling are greatly minimized by the retaining ring and balls of the present invention.

The retaining ring 42 also has the advantage of maintaining the balls 85 in predetermined spaced relation to each other. Thus, the balls are prevented from rubbing against adjacent balls so that scuffing is minimized. This reduces wear and increases the useful life of the balls and the bearing unit 40.

From the foregoing, it is evident that the swivel joint of the present invention provides an improved bearing unit that includes interchangeable parts for increasing the life of the bearing in an economical manner, obviates the need for a port in the outer bearing and a ball retaining plug, minimizes the adverse effects of dimpling, and protects the balls and increases their life. In actual use, the subject swivel joint has been particularly effective in oil well cementing operations where it is used to interconnect lengths of oil well casing that carry fluid under moderately high pressure while constantly rotating.

Although a preferred embodiment of the present invention has been shown and described, it will be understood that various changes and modifications may be made in the details thereof without departing from the spirit and scope of the appended claims.

Having described the invention, what is claimed and desired to be secured by Letters Patent is:

1. A swivel joint comprising a first conduit having an annular generally radial end face and a cylindrical outer surface joining said end face and constituting an inner bearing, said outer surface providing an annular inner raceway; a second conduit coaxial with said first conduit and having a generally radial end flange confronting said end face of the first conduit and projecting radially outward from said end face; a retaining ring surrounding said outer surface, being rotatable therearound, and having a plurality of circumferentially spaced holes; the spacing between any two adjacent holes of any group of at least four successive holes being different than the spacing between any other two adjacent holes in the group whereby no two adjacent holes in the group will simultaneously occupy the positions of the two adjacent holes of the group when said retaining ring is rotated; anti-friction members individually received in said holes and rollably engaging said inner raceway; an outer bearing including annular spacing and thrust portions encircling said outer surface of the first conduit with said spacing portion being positioned between said end flange and said thrust portion, said portions being identical to each other and having outer surfaces, first and second generally radial surfaces projecting in from their outer surfaces, said first radial surfaces being in engagement with each other, said second radial surface of the spacing portion engaging said end flange of the second conduit, and said portions also having annular inner surfaces joining their respective first and second surfaces, each of said inner surfaces of said bearing portions including an annular concave outer raceway segment joining its respective first radial surface, said raceway segments constituting an outer raceway confronting and rollably receiving said anti-friction members therein, said end flange, said spacing portion and said thrust portion having openings in registration with each other; and means extending through said openings releasably connecting said spacing and thrust portions to said end flange, said end flange, said outer bearing and said means being exposed on the outside of said swivel joint.

2. In a swivel joint including a first coupling member having an outer surface provided with an annular inner raceway, a retaining ring rotatably disposed in circumscribing relation to said raceway, said ring having a row of circumferentially spaced holes, said row of holes circumscribing said coupling member, an annular outer bearing circumscribing said ring and having an outer raceway facing said holes, anti-friction members individually captured in said holes and engaging said inner and outer raceways, a second coupling member, and means releasably connecting said outer bearing to said second coupling member, one of said holes constituting a reference hole and the remainder of said holes in said row being identified for reference purposes and in succession as the first hole, the second hole, the third hole, and so forth to the $n$th hole counting in numerical order from said reference hole to said $n$th hole, said first and $n$th holes being located immediately adjacent to and on opposite sides of said reference hole; the improvement wherein the distance $a$ between the reference hole and the first hole is different from the distance $b$ between the first hole and the second hole, wherein said distance $b$ is different from the distance $c$ between the second hole and the third hole, and so on along said row with no two adjacent center-to-center distances between holes being equal and with the distance $n$ between the $n$th hole and the reference hole being different from the distance $a$, there being no repetitive pattern of distances from said reference hole successively to said $n$th hole whereby if the anti-friction members impress dimples in said raceways when the retaining ring is in a predetermined angular position relative to said raceways, and then if the ring moves away from said predetermined position, no two adjacent anti-friction members will simultaneously enter dimples so formed until said retaining ring has rotated relative to said raceways 360° from said predetermined position.

3. In a swivel joint, a first coupling member having an outer surface provided with an annular inner raceway; a retaining ring rotatably disposed in circumscribing relation to said inner raceway, said ring having a plurality of circumferentially spaced openings the axes of which are normal to said raceway, the circumferential distance between the axes of a first predetermined pair of adjacent openings being different from the circumferential distance between the axes of a second predetermined pair of adjacent openings, one of said openings of said first pair comprising one of said openings of said second pair; an annular outer bearing circumscribing said ring and having an outer raceway facing said openings; anti-friction members individually captured in said openings and engaging said inner and outer raceways; a second coupling member coaxial with said first coupling member; means releasably connecting said outer bearing to said second coupling member, said outer bearing having an inner surface including said outer raceway, said inner surface also including intermediate segments projecting axially away from said outer raceway and radially spaced from said outer surface of the first coupling member, radial segments projecting from said intermediate segments toward said first coupling member, and end segments spaced radially closer to said outer surface of the first coupling member than said intermediate segments, said retaining ring being positioned axially between said radial segments of said outer bearing and radially between said intermediate segments and said outer surface of the first coupling member, said ring having opposite radial end faces respectively axially spaced from said radial segments; and annular lubricant retaining members circumscribing the outer surface of the first coupling member and positioned between said end faces of the ring and said radial segments of said outer bearing.

4. In a swivel joint, a first coupling member provided with a first annular raceway; a second coupling member provided with a second annular raceway disposed in confronting relation to said first raceway, said first and second raceways forming a main raceway; and a row of anti-friction elements disposed in said main raceway in generally circumscribing relation thereto for providing substantially frictionless relative rotation between said first and second members; and means disposed in said main raceway between adjacent elements and circumferentially spacing any two adjacent elements of any group of at least four successive elements differently from the spacing between any other two adjacent elements in the group so that if said elements make indentations in one or both of said raceways when the elements are stationary, no two adjacent elements will simultaneously enter any so-formed indentations upon movement of said elements circumferentially of the raceways until each element has moved 360° around said raceways at which position all of said elements will be in registry with the indentations which they made in the raceways.

5. In a swivel joint, a first coupling member having an outer surface provided with an annular inner raceway; a retaining ring rotatably disposed in circumscribing relation to said inner raceway, said ring having a row of circumferetially spaced openings, said row of openings circumscribing said coupling member; an annular outer bearing circumscribing said ring and having an outer raceway facing said openings; anti-friction members individually captured in said openings and engaging said inner and outer raceways; a second coupling member coaxial with said first coupling member; means releasably connecting said outer bearing to said second coupling member, said outer bearing having an inner surface including said outer raceway, said inner surface also including intermediate segments projecting axially away from said outer raceway and radially spaced from said outer surface of the first coupling member, radial segments projecting from said intermediate segments toward said first coupling member, and end segments spaced radially closer to said outer surface of the first coupling member than said intermediate segments, said retaining ring being positioned axially between said radial segments of said outer bearing and radially between said intermediate segments and said outer surface of the first coupling member, said ring having opposite radial end faces respectively axially spaced from said radial segments; and annular lubricant retaining members circumscribing the outer surface of the first coupling member and positioned between said end faces of the ring and said radial segments of said outer bearing.

References Cited by the Examiner

UNITED STATES PATENTS

| | | | |
|---|---|---|---|
| 644,608 | 3/1900 | Keller | 308—201 |
| 1,266,145 | 5/1918 | Newmann | 308—201 |
| 2,391,245 | 12/1945 | Kail | 308—235 X |
| 2,464,712 | 3/1949 | Pearson | 308—201 |

FOREIGN PATENTS

| | | |
|---|---|---|
| 1,026,577 | 3/1958 | Germany. |
| 871,052 | 6/1961 | Great Britain. |

CARL W. TOMLIN, *Primary Examiner.*

THOMAS F. CALLAGHAN, *Examiner.*